(12) United States Patent
Berger et al.

(10) Patent No.: US 11,047,299 B2
(45) Date of Patent: Jun. 29, 2021

(54) DEVICE FOR ADJUSTING THE EFFECTIVE LENGTH OF A CONNECTING ROD DEPENDING ON THE SUPPLY PRESSURE

(71) Applicants: IWIS MOTORSYSTEME GMBH & CO. KG, Munich (DE); AVL LIST GMBH, Graz (AT)

(72) Inventors: Robert Berger, Strallegg (AT); Andreas Krobath, St. Josef / Weststmk (AT); Helfried Sorger, Graz (AT); Malte Heller, Munich (DE)

(73) Assignees: IWIS MOTORSYSTEME GMBH & CO. KG, München (DE); AVL LIST GMBH, Graz (AT)

( * ) Notice: Subject to any disclaimer, the term of this patent is extended or adjusted under 35 U.S.C. 154(b) by 42 days.

(21) Appl. No.: 16/604,140

(22) PCT Filed: Apr. 10, 2018

(86) PCT No.: PCT/EP2018/000185
§ 371 (c)(1),
(2) Date: Oct. 9, 2019

(87) PCT Pub. No.: WO2018/188792
PCT Pub. Date: Oct. 18, 2018

(65) Prior Publication Data
US 2020/0158014 A1    May 21, 2020

(30) Foreign Application Priority Data
Apr. 10, 2017    (DE) .......................... 102017107703.0

(51) Int. Cl.
*F02B 75/04*    (2006.01)
*F01M 1/02*    (2006.01)
(Continued)

(52) U.S. Cl.
CPC ............. *F02B 75/045* (2013.01); *F01M 1/02* (2013.01); *F01M 1/16* (2013.01); *F02D 15/02* (2013.01); *F16C 7/06* (2013.01); *F16C 2360/22* (2013.01)

(58) Field of Classification Search
CPC .......... F02B 75/045; F01M 1/02; F01M 1/16; F02D 15/02; F16C 7/06; F16C 2360/22; F16C 3/06
See application file for complete search history.

(56) References Cited

U.S. PATENT DOCUMENTS 1,978,480 A * 10/1934 Svenson ............... F04C 11/005
                                                                 417/206
5,178,103 A    1/1993 Simko
(Continued)

FOREIGN PATENT DOCUMENTS

DE    691 08 572 T2    8/1995
DE    196 04 865 A1    8/1997
(Continued)

*Primary Examiner* — Joesph J Dallo
*Assistant Examiner* — Kurt Philip Liethen
(74) *Attorney, Agent, or Firm* — BakerHostetler

(57) ABSTRACT

A device for adjusting the effective length of a connecting rod for an internal combustion engine, includes at least one connecting rod which has a variable length and which can be locked in at least two length settings, at least one first oil pump for supplying oil to the at least one connecting rod with a variable length, and a control unit which provides for a switchover between the length settings of the connecting rod in the event of a change in the oil supply pressure for the connecting rod. The aim of the invention is to shorten the switching times during a switchover between the length settings of the connecting rod. A method for providing such a device for adjusting the effective length of a connecting rod is also provided.

15 Claims, 4 Drawing Sheets

(51) Int. Cl.
    *F01M 1/16*    (2006.01)
    *F02D 15/02*   (2006.01)
    *F16C 7/06*    (2006.01)

(56) References Cited

U.S. PATENT DOCUMENTS

| | | | |
|---|---|---|---|
| 5,243,935 A | 9/1993 | Kano et al. | |
| 6,397,796 B1* | 6/2002 | Styron | F01M 1/02 123/78 AA |
| 6,499,446 B1* | 12/2002 | Rao | F02B 75/045 123/48 B |
| 6,622,669 B1* | 9/2003 | Nageswar | F02B 75/045 123/48 B |
| 6,622,672 B1* | 9/2003 | Styron | F01M 1/16 123/78 E |
| 2003/0066418 A1* | 4/2003 | Styron | F02D 15/02 92/60.5 |
| 2007/0221149 A1 | 9/2007 | Ruiz | |
| 2010/0018808 A1* | 1/2010 | Gloge | F16H 61/0031 184/6.12 |
| 2010/0292850 A1* | 11/2010 | Kuah | F01M 11/06 700/282 |
| 2011/0226220 A1* | 9/2011 | Wilkins | F16J 7/00 123/48 B |
| 2016/0237889 A1 | 8/2016 | Melde-Tuczai et al. | |
| 2016/0272171 A1* | 9/2016 | Bunk | B60T 8/17558 |

FOREIGN PATENT DOCUMENTS

| | | |
|---|---|---|
| DE | 101 51 508 A1 | 7/2002 |
| DE | 102 07 750 A1 | 1/2003 |
| DE | 10 2006 059 656 A1 | 7/2007 |
| DE | 10 2007 019 307 A1 | 10/2007 |
| DE | 102 07 750 B4 | 6/2009 |
| JP | S63-248935 A | 10/1988 |
| WO | 2015/055582 A2 | 4/2015 |

* cited by examiner

DEVICE FOR ADJUSTING THE EFFECTIVE LENGTH OF A CONNECTING ROD DEPENDING ON THE SUPPLY PRESSURE

CROSS-REFERENCE TO RELATED APPLICATIONS

This application is a National Stage of International patent application PCT/EP2018/000185, filed on Apr. 10, 2018, which claims priority to foreign German patent application No. DE 102017107703.0, filed on Apr. 10, 2017, the disclosures of which are incorporated by reference in their entirety.

FIELD OF THE INVENTION

The present invention relates to a device for adjusting the effective length of a connecting rod for an internal combustion engine, comprising at least one length-adjustable connecting rod which can be locked in at least two different length positions, at least one first oil pump for supplying oil to the connecting rod, and a control unit which, in the event of a change in an oil supply pressure of the connecting rod, ensures switchover between the length positions of the connecting rod.

The invention also relates to a method of operating such a device.

BACKGROUND

The thermal efficiency $\eta_{TH}$ of an internal combustion engine, in particular of gasoline engines, depends on the compression ratio $\varepsilon$, i.e. the ratio of the total volume before compression to the compression volume ($\varepsilon$=(stroke volume $V_h$+compression volume $V_C$)/compression volume $V_C$). As the compression ratio increases, so does the thermal efficiency. The increase in thermal efficiency via the compression ratio is degressive, but still relatively pronounced in the range of values that are nowadays common ($\varepsilon$=10-14).

In practice, the compression ratio cannot be increased at will. For example, an excessively high compression ratio in gasoline engines leads to knocking. Here the mixture ignites due to the increase in pressure and temperature during compression and not due to the ignition sparks. This early combustion not only leads to unsteady running, but can also cause component damage to the engine.

The compression ratio from which knocking occurs depends, among other things, on the operating point (speed n, temperature T, throttle position, etc.) of the engine. Higher compression is possible in the partial load range. Therefore, there is an effort to adapt the compression ratio to the respective operating point. For this purpose, there are various development approaches in which the position of the stroke pin of the crankshaft or the piston pin of the engine piston is changed or the effective length of the connecting rod is varied. There are solutions for continuous and discontinuous adjustment of the components. Continuous adjustment allows optimum reduction of the $CO_2$ output and consumption thanks to a compression ratio that can be set for each operating point. On the other hand, discontinuous adjustment with two stages designed as end stops of the adjustment movement provides design and operational advantages and still enables significant savings in consumption and $CO_2$ output compared to a conventional crank drive.

Such a VCR connecting rod (variable compression ratio) is known, for example, from WO2015/055582 A2.

According to WO 2015/055582 A2, the compression ratio is adjusted by changing the connecting rod length. The connecting rod length influences the compression volume. The stroke volume is determined by the position of the crankshaft journal and the cylinder bore. A short length of the connecting rod therefore leads to a lower compression ratio than a long length of the connecting rod with otherwise the same geometric dimensions (crankshaft, cylinder head, valve control, etc.). In the known device, the connecting rod length is varied hydraulically between two positions. The entire connecting rod is designed in several parts, whereby the length change is effected by a telescopic mechanism. The connecting rod contains a double-acting hydraulic cylinder. The small connecting rod eye (piston pin) is connected to a piston rod (telescopic rod part) on which a piston is arranged. The piston is axially displaceably guided in a cylinder, which is arranged in the connecting rod part with the large connecting rod eye (crankshaft journal). The piston separates the cylinder into two chambers (upper and lower pressure chamber). These two chambers are supplied with engine oil via check valves (RSV1 and RSV2). If the connecting rod is in the long position, there is no oil in the upper pressure chamber. By contrast, the lower pressure chamber is completely filled with oil. During operation, the connecting rod is subjected to alternating tensile and compressive loads due to the gas and mass forces. In the long position, a tensile force is absorbed by the mechanical contact of the piston with an upper stop. The connecting rod length does not change as a result. An acting compressive force is transmitted via the piston surface to the oil-filled lower chamber. Since the check valve of this chamber prevents the oil from returning, the oil pressure increases. The length of the connecting rod does not change. The connecting rod is hydraulically locked in this direction. In the short position the conditions are reversed. The lower chamber is empty, the upper chamber is filled with oil. A tensile force causes an increase in pressure in the upper chamber. A compressive force is absorbed by a mechanical stop. The length of the connecting rod can be adjusted in two stages by emptying one of the two chambers. One of the two supply check valves (RSV1 and RSV2) is bridged by an assigned return channel (RL1 and RL2). Oil can drain through this return channel. The respective check valve thus loses its effect. The oil supply is provided by the lubrication of the connecting rod bearing. This requires an oil feedthrough from the crankshaft journal via the connecting rod bearing to the connecting rod. Switching is made by selectively emptying one of the two pressure chambers using the mass and gas forces acting on the connecting rod, wherein the respectively other pressure chamber is supplied with oil by an inlet check valve and hydraulically blocked. The two return channels are opened and closed by a control valve, wherein exactly one return channel is always open and the other closed. The actuator for switching the two return channels is hydraulically controlled by the supply pressure of the engine oil pump. The supply pressure of the engine oil pump is regulated by the speed of the engine oil pump. Therefore, a pressure change of the supply pressure is rather slow and no short switching times can be realized. This limits the efficiency of the VCR system.

SUMMARY OF THE INVENTION

It is therefore the object of the present invention to provide a device described above which enables short switching times to change the effective length of the connecting rod.

The invention provides for at least one second oil pump to be provided for this purpose, which can be switched on to the oil supply of the at least one length-adjustable connecting rod if required or which takes over the oil supply of the at least one length-adjustable connecting rod and wherein the second oil pump delivers with a defined delivery flow at the time of switching on to the oil supply of the connecting rod or at the time of taking over the oil supply of the connecting rod.

If the second oil pump is switched on to the oil supply of the connecting rod or the second oil pump takes over the oil supply, the oil supply pressure is immediately increased and the effective length of the connecting rod is immediately adjusted. The required short switching times are thus achieved. This leads to improved exhaust gas values and cost reduction. In addition, fewer disturbance variables have an effect during fast switching, which enables faster signal transmission, which in turn has a positive effect on the complete control and thus ultimately on the overall driving behavior.

In order to achieve the shortest possible switching times, the invention may provide that the defined delivery flow of the second oil pump is greater than zero and preferably at least 50% of the maximum delivery flow of the second oil pump.

In one variant of the invention, the first oil pump and the second oil pump can be designed as a two-part pump. Both pumps are therefore arranged in one housing, which saves space.

In a further variant it can be provided that a first pressure relief valve is arranged in flow direction behind the first and the second oil pump. This pressure relief valve provides protection against overpressure peaks during the switchover process, i.e. when the second oil pump is switched on.

In yet another embodiment it may be provided that the oil pump permanently delivers during operation of the device. Advantageously, the second oil pump circulates and pumps engine oil from the oil sump back into the oil sump if it is not switched on to the first oil pump. The second oil pump is therefore in continuous operation and, when switched on to the first oil pump, immediately delivers the set delivery flow, generating an immediate increase in pressure and a rapid switchover between the two length positions of the connecting rod.

However, it may also be provided that the second oil pump can only be activated when required. This means that the continuous operation of the second oil pump does not cause any loss of power.

With this variant, the control unit can be designed in such a way that it predicts a switchover process between the length positions of the connecting rod and activates the second oil pump before the switchover process, so that the defined delivery rate is reached at the time of the switchover. This also achieves the desired short switching times for switching between the length positions of the connecting rod and thus for changing the compression ratio.

Advantageously, the control unit may have a prediction algorithm which determines the switch-on time of the second oil pump by extrapolating engine parameters of the internal combustion engine. This can ensure that the second oil pump delivers with the defined delivery rate when it is switched on to the first oil pump, thus achieving the desired short switchover time.

In yet another embodiment it may be provided that in the direction of flow behind the first and the second oil pump at least one switchable second pressure relief valve is provided. This second pressure relief valve can be used to set a further pressure level in the device so that a further length position of the connecting rod can be set if the connecting rod is designed accordingly. Further pressure levels and thus further length positions of the connecting rod can be made possible by further pressure relief valves, provided that the connecting rod is designed accordingly.

Advantageously, the second pressure relief valve can be switched on by way of a directional valve. This allows a simple design.

In yet another embodiment it can be provided that the connecting rod comprises a telescopic mechanism with at least one piston guided in a cylinder. This telescopic mechanism allows an easy length adjustment of the connecting rod into the desired length positions.

In a particularly simple design, the first and second oil pumps may be designed to operate according to the displacement principle. The two oil pumps can thus be designed as gear pumps, piston pumps or worm pumps. The pumps then have the required steep characteristic and a simple design.

Space savings and efficient use of the components with simultaneously short switching times can be achieved by the fact that the first oil pump is the engine oil pump of the internal combustion engine.

If the first oil pump is the engine oil pump, a check valve is advantageously arranged between the second oil pump and an oil supply for the internal combustion engine. This prevents the oil pressure in the internal combustion engine from rising sharply when the second oil pump is switched on.

Alternatively, in this case it could be provided that the delivery flow of the first oil pump, i.e. the engine oil pump, is switched off in the direction of the at least one connecting rod when the delivery flow of the second oil pump is switched on. In this case, only the second oil pump is responsible for supplying the connecting rod with oil, so that an increase in the oil pressure in the internal combustion engine with the associated loss of efficiency is also avoided in this case.

The present invention also refers to an internal combustion engine with at least one reciprocating piston with adjustable compression ratio. Here, too, it is the object of the present invention to shorten the switching times when adjusting the compression ratio. According to the invention, this object is achieved by the combustion engine comprising a device described above for adjusting the effective length of a connecting rod.

The object of the invention is further achieved by a method of operating such a device for adjusting the effective length of a connecting rod for an internal combustion engine, the device comprising at least one length-adjustable connecting rod which can be locked in at least two different length positions, at least one first oil pump for to the oil supply of the at least one length-adjustable connecting rod, at least one second oil pump which can be switched on, if required, to the oil supply of the at least one length-adjustable connecting rod or takes over the oil supply of the at least one length-adjustable connecting rod, and a control unit which, in the event of a change in an oil supply pressure of the connecting rod, ensures switchover between the length positions of the connecting rod, wherein the second oil pump already delivers with a defined delivery flow at least at the time of switching on to or taking over of the oil supply.

It is advantageous that the second oil pump delivers permanently when the device is in operation or that the second oil pump is only activated when required.

In a variant of the invention, the control unit is used to predict a switchover process between the length positions of the connecting rod and the second oil pump is activated before the switchover process, so that at the time of the switchover the defined delivery rate of the second oil pump is reached, wherein the switch-on time of the second oil pump is preferably determined with a prediction algorithm by extrapolation of engine parameters of the internal combustion engine.

In another variant of the invention, a delivery flow of the first oil pump in the direction of the at least one connecting rod is switched off when the delivery flow of the second oil pump is switched on.

BRIEF DESCRIPTION OF THE DRAWINGS

In the following, the invention is explained in more detail using non-restrictive embodiments that are shown in the drawings.

DETAILED DESCRIPTION

Figure 1:
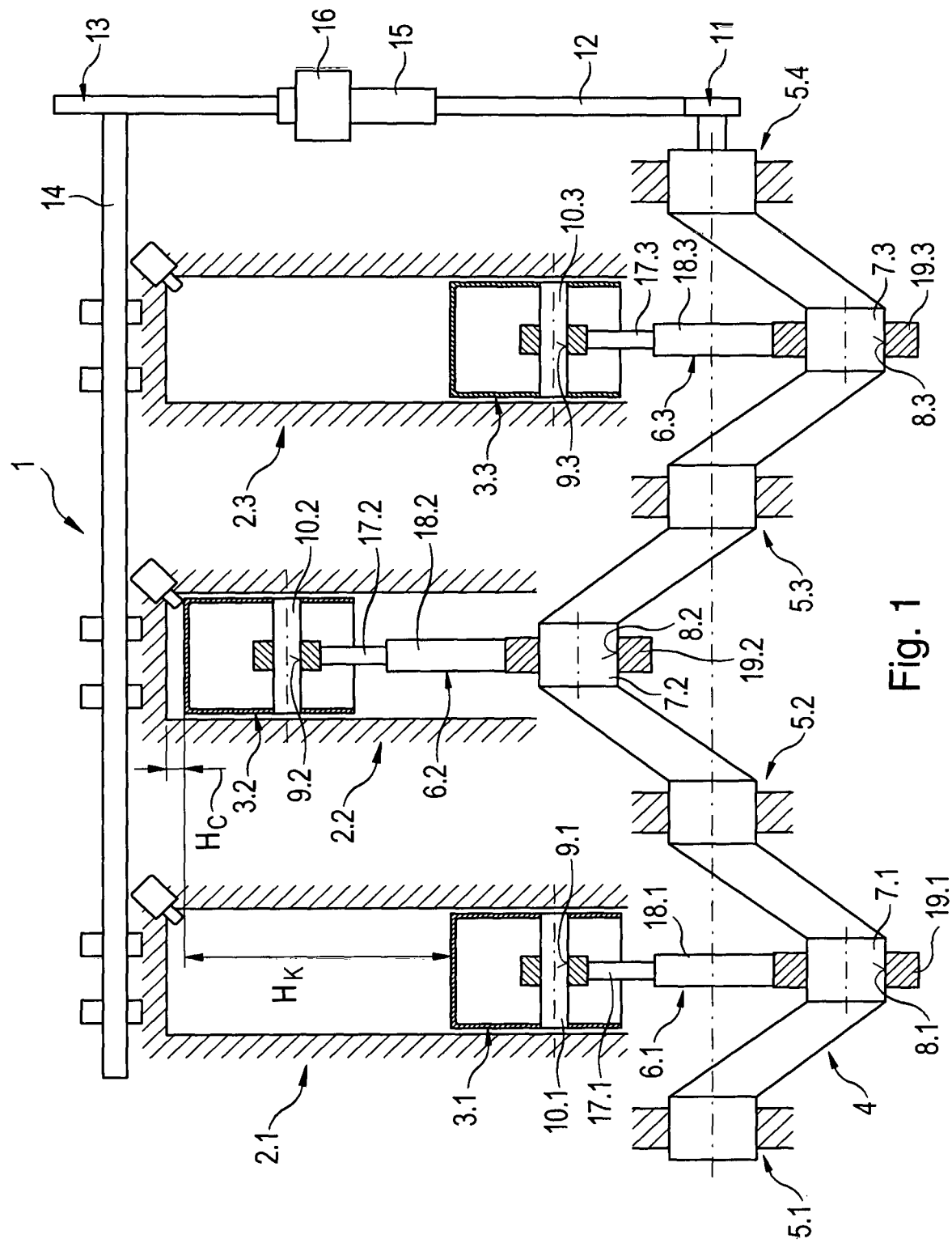
FIG. 1 shows a schematic cross-section of an internal combustion engine.

FIG. 1 shows a schematic representation of an internal combustion engine 1, for example a gasoline engine. The internal combustion engine 1 has three cylinders 2.1, 2.2 and 2.3, in each of which a reciprocating piston 3.1, 3.2, 3.3 moves up and down. Furthermore, the internal combustion engine 1 comprises a crankshaft 4, which is rotatably supported by crankshaft bearings 5.1-5.4. The crankshaft 4 is connected by means of the connecting rods 6.1, 6.2 and 6.3 to the associated reciprocating piston 3.1, 3.2 and 3.3 respectively. For each connecting rod 6.1, 6.2 and 6.3 the crankshaft 4 comprises an eccentrically arranged crankshaft journal 7.1, 7.2 and 7.3. The large connecting rod eye 8.1, 8.2 and 8.3 is each time mounted on the associated crankshaft journal 7.1, 7.2 and 7.3. The small connecting rod eye 9.1, 9.2 and 9.3 is each time mounted on a piston pin 10.1, 10.2 and 10.3 and thus pivotably connected to the associated reciprocating piston 3.1, 3.2 and 3.3.

The crankshaft 4 is equipped with a crankshaft sprocket 11 and coupled by means of a control chain 12 with a camshaft sprocket 13. The camshaft sprocket 13 drives a camshaft 14 with its associated cams to actuate the intake and exhaust valves (not shown in detail) of each cylinder 2.1, 2.2 and 2.3. The empty run of the control chain 12 is tensioned by means of a pivotally arranged tensioning rail 15, which is pressed by means of a chain tensioner 16 against it. The tension run of the control chain 12 can slide along a guide rail. The essential function of this control drive, including fuel injection and spark plug ignition, is not explained in detail and is assumed to be known. The eccentricity of the crankshaft journals 7.1, 7.2 and 7.3 significantly determines the stroke path $H_K$, especially if, as in the present case, the crankshaft 4 is arranged exactly centrically under the cylinders 2.1, 2.2 and 2.3. The reciprocating piston 3.1 is shown in FIG. 1 in its lowest position while the reciprocating piston 3.2 is shown in its highest position. In the present case the difference results in the stroke path $H_K$. The remaining height $H_C$ (see cylinder 2.2) results in the remaining compression height in the cylinder 2.2. In conjunction with the diameter of the reciprocating piston 3.1, 3.2 or 3.3 or the associated cylinder 2.1, 2.2 and 2.3 the stroke volume $V_h$ results from the stroke path $H_K$ and the compression volume $V_c$ is calculated from the remaining compression height $H_C$. Of course, the compression volume $V_c$ depends largely on the design of the cylinder cover. The compression ratio ε is calculated from these volumes $V_h$ and $V_c$. ε is calculated from the sum of the stroke volume $V_h$ and the compression volume $V_c$ divided by the compression volume $V_c$. Today's standard values of the compression ratio ε for gasoline engines are between 10 and 14.

According to the invention the connecting rods 6.1, 6.2 and 6.3 are designed to be adjustable in their length so that the compression ratio ε can be adapted depending on the operating point (n, T, throttle position) of the internal combustion engine 1. This allows, for example, a higher compression ratio in the partial load range than in the full load range. For this purpose, each connecting rod 6.1, 6.2, 6.3 comprises a first rod part 17.1, 17.2, 17.3 and a second rod part 18.1, 18.2, 18.3. The small connecting rod eye 9.1, 9.2, 9.3 is respectively formed at the upper end of each first rod part 17.1, 17.2, 17.3. Every second rod part 18.1, 18.2, 18.3 is connected in its lower area to a lower bearing shell 19.1, 19.2, 19.3 each. Each lower bearing shell 19.1, 19.2, 19.3 together with the lower area of the respective second rod part 18.1, 18.2, 18.3 surrounds the said large connecting rod eye 8.1, 8.2, 8.3. The lower bearing shells 19.1, 19.2, 19.3 and the second rod parts 18.1, 18.2, 18.3 are connected to each other in the usual manner using fastening means such as screws. The lower end of each first rod part 17.1, 17.2, 17.3 is provided with an adjusting piston (not shown) which is displaceably guided in a piston bore (not shown) formed in each second rod part 18.1, 18.2, 18.3. The adjusting piston and the piston bore form a telescopic mechanism for changing the effective length of the respective connecting rod 6.1, 6.2, 6.3. This telescopic mechanism is part of a device for adjusting the effective length of the respective connecting rod 6.1, 6.2, 6.3, with which the connecting rod can be locked in at least two different length positions. The device for adjusting the effective length of the connecting rod also includes a control unit which, when an oil supply pressure changes, ensures switchover between the length positions of the connecting rod. The oil supply pressure is generated by at least one oil pump.

It is also conceivable that the connecting rod comprises a different length adjustment mechanism and is not equipped with the telescopic mechanism described above.

Figure 2:
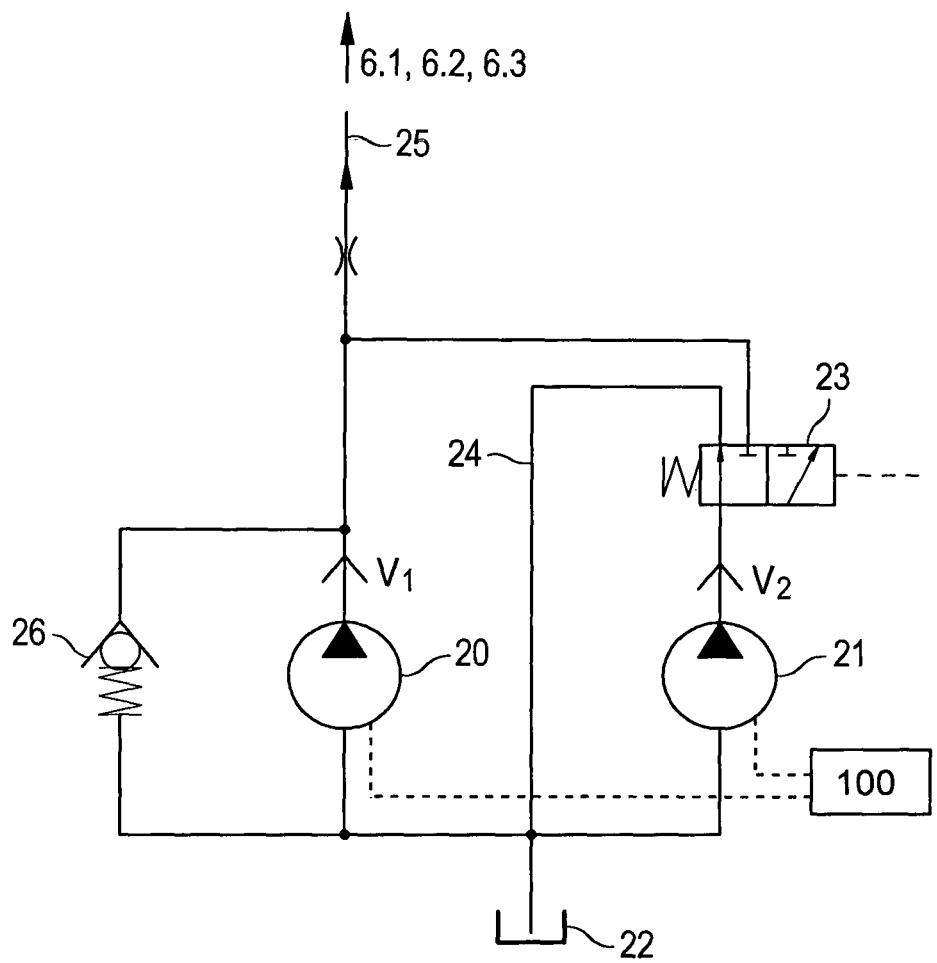
FIG. 2 shows a circuit diagram for a detail of a device for adjusting the effective length of a connecting rod of the internal combustion engine from FIG. 1.
Figure 3:
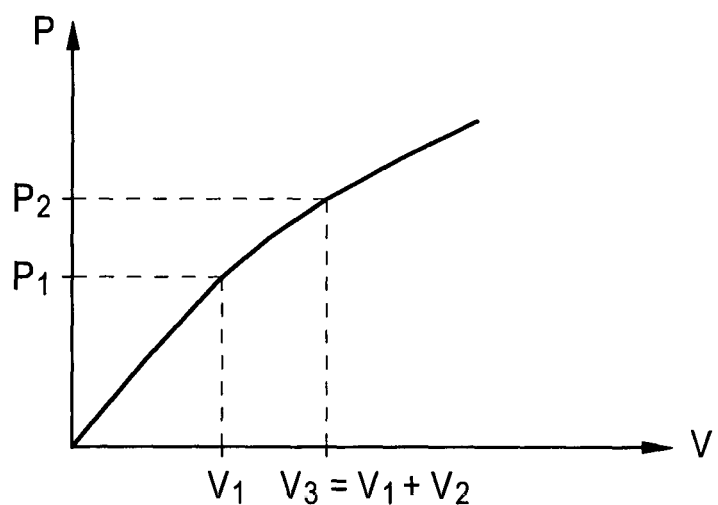
FIG. 3 shows a diagram showing the pressure generated by the oil pumps as a function of the volume flow for the device from FIG. 2.

FIG. 2 shows a detail of the device for adjusting the effective length of the connecting rod, namely two oil pumps for generating an oil supply pressure for the connecting rod. A first oil pump 20 delivers a first delivery flow V1 of engine oil from the oil sump 22 into a first line 25 in the direction of the connecting rod and the bearings. The first oil pump 20 is in permanent operation when the internal combustion engine 1 is in operation. A second oil pump 21 is arranged parallel to the first oil pump 20. The second oil pump 21 can be switched in parallel to the first oil pump 20 via a first directional valve 23 and then delivers a second delivery flow V2 also into the first line 25 in the direction of the connecting rod, thus increasing the oil supply pressure for the connecting rod. Furthermore, the second oil pump 21 is connected to the oil sump 22 via a second line 24. In the case shown, the first directional valve 23 is switched in such a way that the second oil pump 21 in operation delivers oil from the oil sump 22 via the line 24 back into the oil sump 22 and thus circulates the oil. In a first design of the device for adjusting the effective length of the connecting rod, the second oil pump 21 is also in permanent operation when the device is in operation. During operation of the internal combustion engine 1 at a low pressure level (low oil supply pressure), the second oil pump 21 is not involved in the oil supply of the connecting rod. As shown in FIG. 2, it circulates the engine oil from the oil sump 22 and via the line 24 back into the oil sump 22. If the load in the internal combustion engine 1 changes so that the compression ratio in the reciprocating piston is to be changed, the second oil pump 21 is connected in parallel with the first oil pump 20 via the directional valve 23, so that the delivery flow V2 of the second oil pump 21 is switched on to the delivery flow V1 of the first oil pump 20 and the oil supply pressure in the first line 25 increases abruptly. This is shown in FIG. 3. The system pressure then increases in accordance with the consumption characteristic curve (connecting rod and bearing). The first oil pump 20 delivers with a first delivery flow V1, which leads to a first supply pressure $p_1$ in the supply line 25. The second oil pump 21 delivers with a second delivery flow V2. If the second oil pump 21 is now switched in parallel to the first oil pump 20 via the directional valve 23, the delivery flow increases and is now V3=V1+V2. This also increases the pressure in the supply line 25 to the pressure $p_2$. Through this pressure increase, the control unit 100 recognizes that the connecting rod is to be transferred from a first length position into a second length position and initiates a corresponding switchover process. A first pressure relief valve 26, located in flow direction behind the first oil pump 20 and the second oil pump 21, protects against pressure peaks during the switchover process. The power loss due to the continuous operation of the second oil pump 21 is negligible. To sum up, very short switching times can be achieved with this device compared to speed control of the oil pump.

The first oil pump 20 and the second oil pump 21 can also be designed as a two-part pump and take over the supply of the connecting rod. Both the first oil pump 20 and the second oil pump 21 operate preferably according to the displacement principle and are designed, for example, as gear pumps, piston pumps or worm pumps with correspondingly steep characteristics.

In a second design of the device for adjusting the effective length of the connecting rod, which is not shown here, the second oil pump 21 is only switched on when required. In this case, the control unit 100 includes a prediction algorithm which by extrapolating engine parameters calculates a probability with which the second oil pump 21 is required. The second oil pump 21 is thus activated in good time before the switchover requirement in order to be able to build up sufficient pressure so that the required switchover pressure can be generated immediately when the switchover requirement arises. At the time when the delivery flow V2 of the second oil pump 21 is switched on to the delivery flow V1 of the first oil pump 20, the second oil pump 21 therefore already delivers with the defined delivery flow V2. Of course, this delivery flow V2 must be >0 and usually lies in a range of 10-90% of the maximum delivery flow V2 of the second oil pump 21.

The control unit 100 is shown as an example in FIG. 2 and controls, among other things, the first 20 and second oil pump 21. For reasons of clarity, the control unit 100 is not shown in the embodiments of the other figures.

Figure 4:
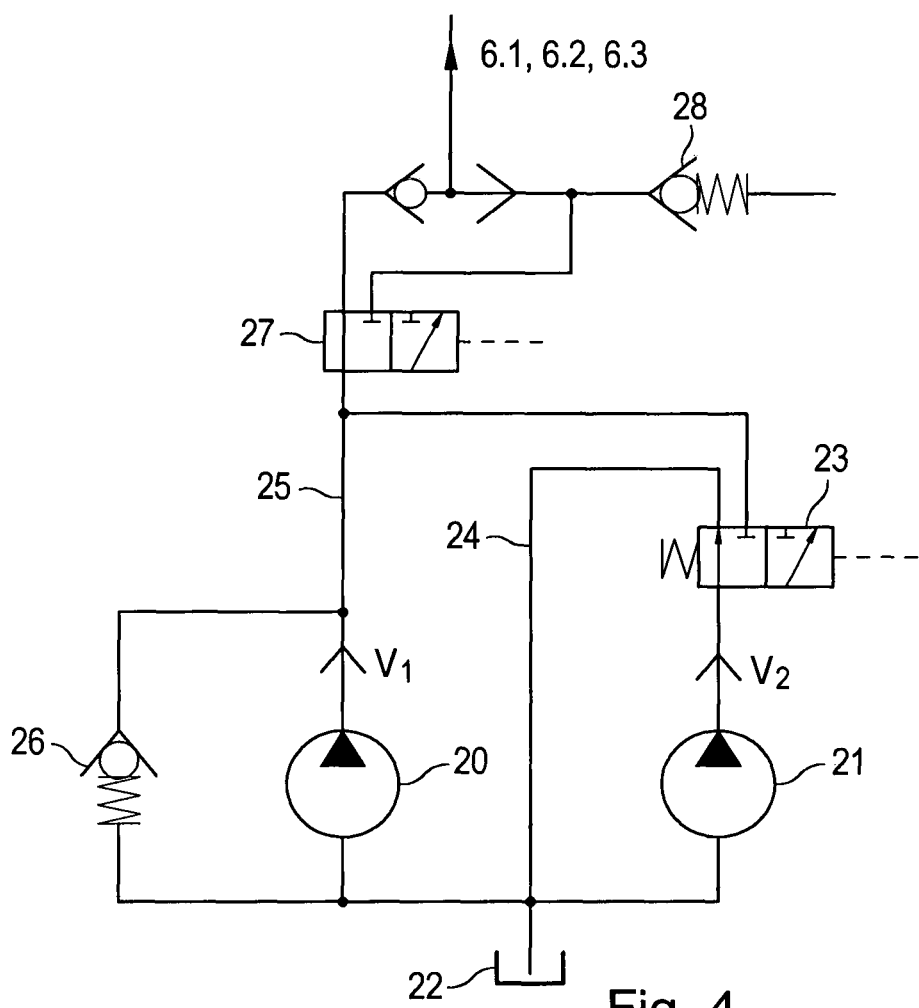
FIG. 4 shows a circuit diagram for a detail of a variant of the device for adjusting the effective length of the connecting rod.
Figure 5:
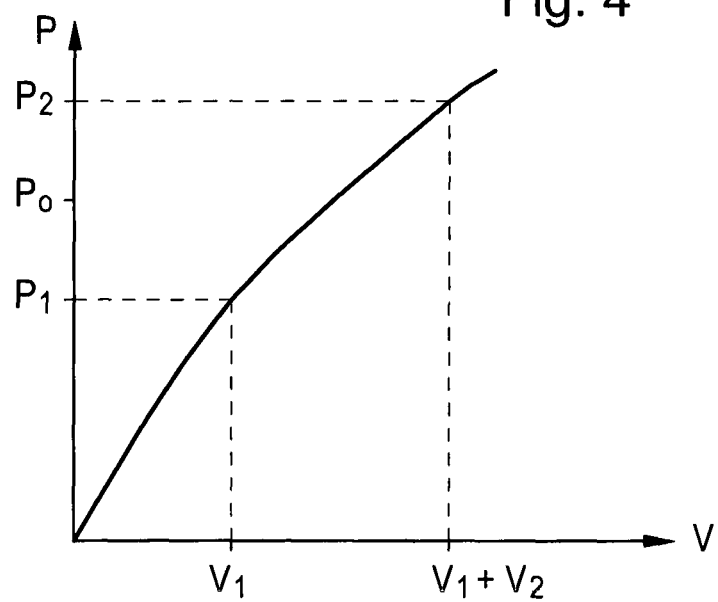
FIG. 5 shows a diagram showing the pressure generated by the oil pumps as a function of the volume flow for the device from FIG. 4.

FIG. 4 shows a slight modification of the device for adjusting the effective length of a connecting rod. Only the differences are described below. The device again includes the first oil pump 20 and the second oil pump 21, which are arranged as shown in FIG. 2. In the direction of flow behind the two oil pumps 20, 21 a second directional valve 27 is arranged in the first line 25. A second pressure relief valve 28 can be switched on via this second directional valve 27. The second pressure relief valve 28 is set to trigger at a pressure $p_5$ which lies between the first pressure $p_1$ generated by the first oil pump 20 and the second pressure $p_2$ jointly generated by both oil pumps 20, 21 (see FIG. 5). In this way, it is possible to create circuits that require three pressure ranges. The leaks caused by the second pressure relief valve 28 lead to energy losses. This switching state should therefore only be adopted for a limited period of time.

Figure 6:
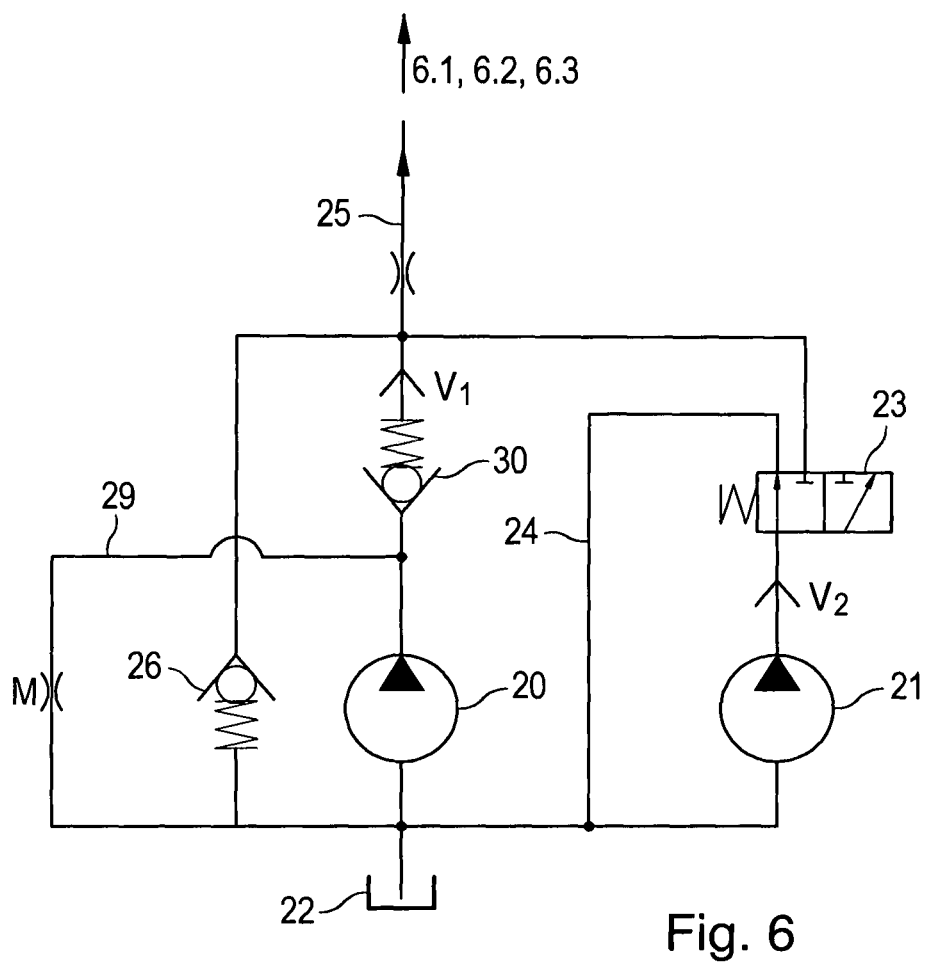
FIG. 6 shows a circuit diagram for a detail of another variant of the device for adjusting the effective length of the connecting rod.

FIG. 6 shows a circuit diagram in which a further variant for the oil supply of the connecting rods 6.1, 6.2, 6.3 is shown. Only the differences are described below. Again a first oil pump 20 and a second oil pump 21 are provided, wherein the first oil pump 20 is the motor oil pump. The first pump 20 pumps a first delivery flow V1 of engine oil from the oil sump 22 via a line 25 in the direction of the connecting rods 6.1, 6.2, 6.3. In addition, the first oil pump 20 supplies the internal combustion engine M with engine oil via a supply line 29. The second oil pump 21 is arranged parallel to the first oil pump 20. The second oil pump 21 pumps a second delivery flow V2 of engine oil from the oil sump 22. As described above, the second oil pump 21 circulates the delivery flow V2 back into the oil sump 22 in a first switching state. If the length of the connecting rods 6.1, 6.2, 6.3 is to be changed, the supply pressure of the connecting rods 6.1, 6.2, 6.3 must be changed. The second delivery flow V2 of the second oil pump 21 is switched to the line 25 via the first directional valve 23, so that the second oil pump 21 now takes over the oil supply of the connecting rods 6.1, 6.2, 6.3. This changes the oil supply pressure for the connecting rods 6.1, 6.2, 6.3. In order to avoid that the oil pressure in the internal combustion engine M is also increased thereby, a check valve 30 is arranged between the internal combustion engine M and the second oil pump 21.

Figure 7:
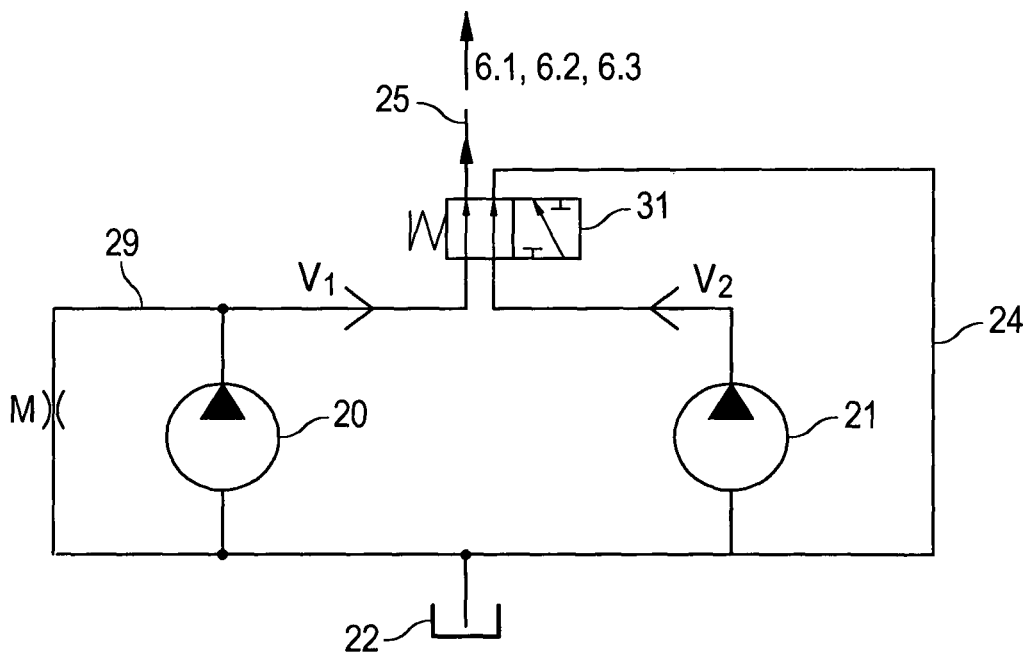
FIG. 7 shows a circuit diagram for a detail of yet another variant of the device for adjusting the effective length of the connecting rod.

FIG. 7 shows a circuit diagram in which another variant for the oil supply of the connecting rods 6.1, 6.2, 6.3 is shown. As in the variant from FIG. 6, a first oil pump 20 and a second oil pump 21 are again provided, wherein the first oil pump 20 is the engine oil pump. The first oil pump 20 delivers a first delivery flow V1 of engine oil from the oil sump 22 via the line 25 in the direction of the connecting rods 6.1, 6.2, 6.3. In addition, the first oil pump 20 supplies the internal combustion engine M with engine oil from the oil sump 22 via a supply line 29. A second oil pump 21 is also provided here, which pumps a second delivery flow V2 of engine oil from the oil sump 22. The delivery flow V2 can either be recirculated into the oil sump 22 via a line 24 or take over the oil supply of the connecting rods 6.1, 6.2, 6.3 via the line 25. A directional valve 31 is provided for this purpose. The directional valve 31 connects either the first oil pump 20 or the second oil pump 21 with the line 25. The delivery flow V1 of the first oil pump 20 differs from the delivery flow V2 of the second oil pump 21. This achieves a different supply pressure of the connecting rods 6.1, 6.2, 6.3 in each case. If a change in length of the connecting rods 6.1, 6.2, 6.3 is to be initiated, the directional valve 31 switches over so that the oil pump 20, 21 currently delivering into the line 25 is switched away from the line 25 and the other oil pump 21, 20 is switched on to the line 25. As described above, this leads to a change in the supply pressure of the connecting rods 6.1, 6.2, 6.3 and thus to an initiation of the length change.

LIST OF REFERENCE NUMERALS 1 internal combustion engine
2.1, 2.2, 2.3 cylinder
3.1, 3.2, 3.3 reciprocating piston
4 crankshaft
5.1, 5.2, 5.3, 5.4 crankshaft bearing
6.1, 6.2, 6.3 connecting rod
7.1, 7.2, 7.3 crankshaft journal
8.1, 8.2, 8.3 large connecting rod eye
9.1, 9.2, 9.3 small connecting rod eye
10.1, 10.2, 10.3 piston pin
11 crankshaft sprocket
12 control chain
13 camshaft sprocket
14 camshaft
15 tensioning rail
16 chain tensioner
17.1, 17.2, 17.3 first rod part
18.1, 18.2, 18.3 second rod part
19.1, 19.2, 19.3 lower bearing shell
20 first oil pump
21 second oil pump
22 oil sump
23 first directional valve
24 line
25 line
26 first pressure relief valve
27 second directional valve
28 second pressure relief valve
29 supply line internal combustion engine
30 check valve
31 directional valve
100 control unit
$\eta_{TH}$ thermal efficiency
$V_h$ stroke volume
$V_c$ compression volume
$H_C$ compression height
$H_K$ stroke path
$\varepsilon$ compression ratio
n speed
T temperature
$p_1$ pressure
$p_2$ pressure
V1 first delivery flow (first oil pump)
V2 second delivery flow (second oil pump)
V3 third delivery flow
$p_\ddot{o}$ opening pressure pressure relief valve
M internal combustion engine

The invention claimed is:
1. A device for adjusting an effective length of a connecting rod for an internal combustion engine, comprising: at least one length-adjustable connecting rod which can be locked in at least two different length positions, at least one first oil pump for an oil supply of the at least one length-adjustable connecting rod, and a control unit which, in an event of a change in an oil supply pressure of the connecting rod, ensures switchover between the length positions of the connecting rod, wherein at least one second oil pump is provided, which can be switched on, if required, to the oil supply of the at least one length-adjustable connecting rod or takes over the oil supply of the at least one length-adjustable connecting rod, and a defined delivery flow (V2) can already be delivered with the second oil pump at least at a time of switching on to or taking over the oil supply, wherein the second oil pump is activated only if required; wherein the control unit is designed in such a way that it predicts a switchover operation between the length positions of the connecting rod and activates the second oil pump before the switchover operation, so that at the time of the switching operation a defined delivery rate (V2) of the second oil pump is reached, and wherein the control unit has a prediction algorithm with which the switch-on time of the second oil pump can be determined by extrapolation of engine parameters of the internal combustion engine.

2. The device according to claim 1, wherein the defined delivery flow (V2) of the second oil pump is >0.

3. The device according to claim 2, wherein the defined delivery flow (V2) of the second oil pump amounts to at least 50% of the maximum delivery flow of the second oil pump.

4. The device according to claim 1, wherein the first oil pump and the second oil pump are designed as a two-part pump.

5. The device according to claim 1, wherein a first pressure relief valve is arranged in the direction of flow behind the first oil pump and the second oil pump.

6. The device according to claim 1, wherein at least one switchable second pressure relief valve is provided in flow direction behind the first oil pump and the second oil pump.

7. The device according to claim 6, wherein the second pressure relief valve can be switched on by means of a directional valve.

8. The device according to claim 1, wherein the connecting rod comprises a telescopic mechanism with at least one piston guided in a cylinder.

9. The device according to claim 1, wherein the first oil pump and the second oil pump operate according to a displacement principle.

10. The device according to claim 1, wherein the first oil pump is an engine oil pump of the internal combustion engine (M).

11. The device according to claim 10, wherein a check valve is arranged between the second oil pump and an oil supply for the internal combustion engine (M).

12. The device according to claim 10, wherein a delivery flow (V1) of the first oil pump in a direction of the at least one connecting rod is switched off when the delivery flow (V2) of the second oil pump is switched on.

13. An internal combustion engine comprising at least one reciprocating piston with adjustable compression ratio, comprising the device according to claim 1.

14. A method of operating a device for adjusting an effective length of a connecting rod for an internal combustion engine comprising: at least one length-adjustable connecting rod which can be locked in at least two different length positions, at least one first oil pump for an oil supply of the at least one length-adjustable connecting rod, at least one second oil pump which can be switched on, if required, to the oil supply of the at least one length-adjustable connecting rod or takes over the oil supply of the at least one length-adjustable connecting rod, and a control unit which, in an event of a change in an oil supply pressure of the connecting rod, ensures switchover between the length positions of the connecting rod, wherein the second oil pump already delivers with a defined delivery flow (V2) at least at a time of switching on to or taking over the oil supply, wherein the second oil pump is activated only when required; wherein the control unit is used to predict a switchover operation between the length positions of the connecting rod and the second oil pump is activated before the switchover operation, so that at the time of switchover the defined delivery rate of the second oil pump is reached, wherein the switch-on time of the second oil pump is determined with a prediction algorithm by extrapolation of engine parameters of the internal combustion engine.

15. The method according to claim 14, wherein a delivery flow (V1) of the first oil pump in a direction of the at least one connecting rod is switched off when the delivery flow (V2) of the second oil pump is switched on.

* * * * *